United States Patent
Clark et al.

(10) Patent No.: US 11,893,981 B1
(45) Date of Patent: Feb. 6, 2024

(54) SEARCH SYSTEM AND METHOD HAVING CIVILITY SCORE

(71) Applicant: Seekr Technologies Inc., Vienna, VA (US)

(72) Inventors: Robin J. Clark, Vienna, VA (US); Ali Taleb Zadeh Kasgari, Vienna, VA (US); Stefanos Poulis, Vienna, VA (US)

(73) Assignee: SEEKR TECHNOLOGIES INC., Vienna, VA (US)

( * ) Notice: Subject to any disclaimer, the term of this patent is extended or adjusted under 35 U.S.C. 154(b) by 0 days.

(21) Appl. No.: 18/243,588

(22) Filed: Sep. 7, 2023

Related U.S. Application Data

(63) Continuation-in-part of application No. 18/220,437, filed on Jul. 11, 2023.

(51) Int. Cl.
| | |
|---|---|
| *G10L 15/00* | (2013.01) |
| *G10L 15/183* | (2013.01) |
| *G10L 15/26* | (2006.01) |
| *G10L 25/48* | (2013.01) |
| *G10L 15/22* | (2006.01) |
| G10L 25/30 | (2013.01) |
| G10L 15/16 | (2006.01) |

(52) U.S. Cl.
CPC ............ *G10L 15/183* (2013.01); *G10L 15/22* (2013.01); *G10L 15/26* (2013.01); *G10L 25/48* (2013.01); G10L 15/16 (2013.01); G10L 25/30 (2013.01)

(58) Field of Classification Search
CPC ......... G10L 15/16; G10L 25/30; G10L 25/27; G10L 19/00; G10L 19/005; G10L 15/07; G10L 15/20; G10L 15/22; G10L 15/26; G10L 15/30; G10L 15/02; G10L 15/063; G10L 15/12; G10L 15/08; G10L 15/14; G10L 15/1815; G10L 15/197; G10L 15/1822; G10L 15/183; G10L 15/19; G10L 15/193; G06F 16/685; H03M 2201/40; H03M 2201/60
See application file for complete search history.

(56) References Cited

U.S. PATENT DOCUMENTS

| | | |
|---|---|---|
| 5,696,962 A | 12/1997 | Kupiec |
| 5,909,510 A | 6/1999 | Nakayama |
| 6,026,388 A | 2/2000 | Liddy et al. |
| 6,119,114 A | 9/2000 | Smadja |
| 6,226,668 B1 | 5/2001 | Silverman |
| 6,601,075 B1 | 7/2003 | Huang et al. |
| 6,651,057 B1 | 11/2003 | Jin et al. |
| 6,807,565 B1 | 10/2004 | Dodrill et al. |
| 6,847,969 B1 | 1/2005 | Mathal et al. |
| 6,990,514 B1 | 1/2006 | Dodrill et al. |
| 7,062,485 B1 | 6/2006 | Jin et al. |
| 7,076,484 B2 | 7/2006 | Dworkis et al. |

(Continued)

FOREIGN PATENT DOCUMENTS

| | | |
|---|---|---|
| WO | WO/0077690 A1 | 12/2000 |

*Primary Examiner* — Vu B Hang
(74) *Attorney, Agent, or Firm* — Manatt, Phelps & Phillips, LLP

(57) ABSTRACT

A scoring system and method identifies personal attacks in a piece of audio content and generates a civility score for the piece of audio content that can differentiate between personal attacks and vernacular/casual banter. The piece of audio content may be a podcast.

12 Claims, 5 Drawing Sheets

(56) References Cited

U.S. PATENT DOCUMENTS

| | | |
|---|---|---|
| 7,120,925 B2 | 10/2006 | D'Souza et al. |
| 7,197,497 B2 | 3/2007 | Cossock |
| 7,240,067 B2 | 7/2007 | Timmons |
| 7,313,622 B2 | 12/2007 | Lee et al. |
| 7,475,404 B2 | 1/2009 | Hamel |
| 7,516,123 B2 | 4/2009 | Betz et al. |
| 7,606,810 B1 | 10/2009 | Jeavons |
| 7,827,125 B1 | 11/2010 | Rennison |
| 7,836,060 B1 | 11/2010 | Rennison |
| 7,870,117 B1 | 1/2011 | Rennison |
| 7,925,973 B2 | 4/2011 | Allaire et al. |
| 7,933,893 B2 | 4/2011 | Walker et al. |
| 8,001,064 B1 | 8/2011 | Rennison |
| 8,060,518 B2 | 11/2011 | Timmons |
| 8,195,666 B2 | 6/2012 | Jeavons |
| 8,219,911 B2 | 7/2012 | Clarke-Martin et al. |
| 10,733,452 B2 * | 8/2020 | Attorre ............... G10L 15/1815 |
| 2001/0021934 A1 | 9/2001 | Yokoi |
| 2002/0007393 A1 | 1/2002 | Hamel |
| 2002/0062340 A1 | 5/2002 | Kloecker et al. |
| 2002/0095336 A1 | 7/2002 | Trifon et al. |
| 2002/0147578 A1 | 10/2002 | O'Neil et al. |
| 2002/0169669 A1 | 11/2002 | Stetson et al. |
| 2002/0169771 A1 | 11/2002 | Melmon et al. |
| 2003/0191816 A1 | 10/2003 | Landress et al. |
| 2003/0212954 A1 | 11/2003 | Patrudu |
| 2003/0217052 A1 | 11/2003 | Rubenczyk et al. |
| 2004/0049574 A1 | 3/2004 | Watson et al. |
| 2004/0117400 A1 | 6/2004 | McCrystal et al. |
| 2005/0091200 A1 | 4/2005 | Melton et al. |
| 2005/0188402 A1 | 8/2005 | de Andrade et al. |
| 2006/0031419 A1 | 2/2006 | Huat |
| 2006/0047632 A1 | 3/2006 | Zhang |
| 2006/0117348 A1 | 6/2006 | D'Souza et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0260671 A1 | 8/2007 | Harinstein et al. |
| 2008/0010142 A1 | 1/2008 | O'Brien et al. |
| 2008/0104113 A1 | 5/2008 | Wong |
| 2008/0221983 A1 | 9/2008 | Ausiannik et al. |
| 2009/0024574 A1 | 1/2009 | Timmons |
| 2009/0197581 A1 | 8/2009 | Gupta et al. |
| 2009/0248668 A1 | 10/2009 | Zheng |
| 2010/0100545 A1 | 4/2010 | Jeavons |
| 2010/0313116 A1 | 12/2010 | Hyman |
| 2011/0166918 A1 | 7/2011 | Allaire et al. |
| 2011/0191163 A1 | 8/2011 | Allaire et al. |
| 2012/0078895 A1 | 3/2012 | Chu-Carroll |
| 2012/0143792 A1 | 6/2012 | Wang |
| 2018/0101534 A1 | 4/2018 | Alexander, Jr. |
| 2019/0065744 A1 | 2/2019 | Gaustad |
| 2020/0125639 A1 | 4/2020 | Doyle |
| 2020/0126533 A1 | 4/2020 | Doyle |

\* cited by examiner

Please identify the following types of attacks in the podcast transcript
sample '''{input}''':\n1. Profanities directed at individuals or a group\n2.
Negative opinions and use of derogatory language towards a group or an
individual\n3. Criticism and negative evaluation towards a group or an
individual \n4. Criticism and negative perspective on the situation and the
motivations of certain individuals.\n\n\nDo this in a step by step manner.
Give out the result of each step:
\nStep 1: Find if each one of the four mentioned attacks exist in the
sample.
\nstep 2: If none of above attacks exist, or if you are not sure then return
None.
\nStep 3: If any of these attacks exist in the sample then extract instances
of these attack for each of four mentioned attack.
\nStep 4: Combine the results of last two steps in a single format:\nattacks:
attacks here\nexamples: examples here
\nStep 5: Format your response in step 4 as a JSON object
with \"attacks\" and \"examples\" as the keys.\n"

FIGURE 4

SEARCH SYSTEM AND METHOD HAVING CIVILITY SCORE

PRIORITY CLAIMS/RELATED APPLICATIONS

This application is a continuation in part of and claims priority under 35 USC 120 to U.S. patent application Ser. No. 18/220,437 filed Jul. 11, 2023 and titled "Search System and Method Having Quality Scoring", the entirety of which is incorporated herein by reference.

FIELD

The disclosure relates to search system and method that generates a civility score for content and in particular to a search system and method for podcasts that generates a civility score for podcasts that may be displayed to a user.

BACKGROUND

A podcast is a program made available in digital format for download over the Internet. For example, a podcast may be digital audio files that can be consumed by a person that downloads the podcasts. Examples of the most popular types of podcasts include interview podcasts, conversational (co-hosted format) podcasts, educational podcasts, solo podcasts, non-fiction storytelling+news podcasts, podcast theater and bite-sized content or limited run podcast series.

Companies may want to present advertisements along with the podcast. In order to determine the right podcast for an advertisement, a brand marketer needs a highly actionable way to measure brand suitability and maximize brand affinity in podcast advertising. It would be desirable to provide a tool by which advertisers can objectively measure the volume and intensity of personal attacks within the nation's top podcasts. Trying to identify personal attacks in podcasts presents several challenges. First, because the language used in most podcasts may be informal, sarcastic or ironic, differentiating between personal attacks and vernacular/casual banter is non-trivial. Second, speak or talk in a podcast is subject to individual interpretations and cultural norms and a discussion that one person perceives as offensive may not be offensive to another person. Third, the variability in language and tone for different speakers further complicates the process of identifying insults and personal attacks, especially if the listener is not familiar with the speakers' background or communication style. These challenges result from technical problems in known system and techniques that cannot and do not identify personal attacks in podcasts.

Thus, it is desirable to provide a civility scoring system that uses technology and provides a technical solution to identify personal attacks in a podcast and generates a civility score for each podcast and it is to this end that the disclosure is directed.

BRIEF DESCRIPTION OF THE DRAWINGS

FIG. 4 illustrates an example of an LLM prompt used in the civility score engine in FIG. 2.

DETAILED DESCRIPTION OF ONE OR MORE EMBODIMENTS

Figure 1:
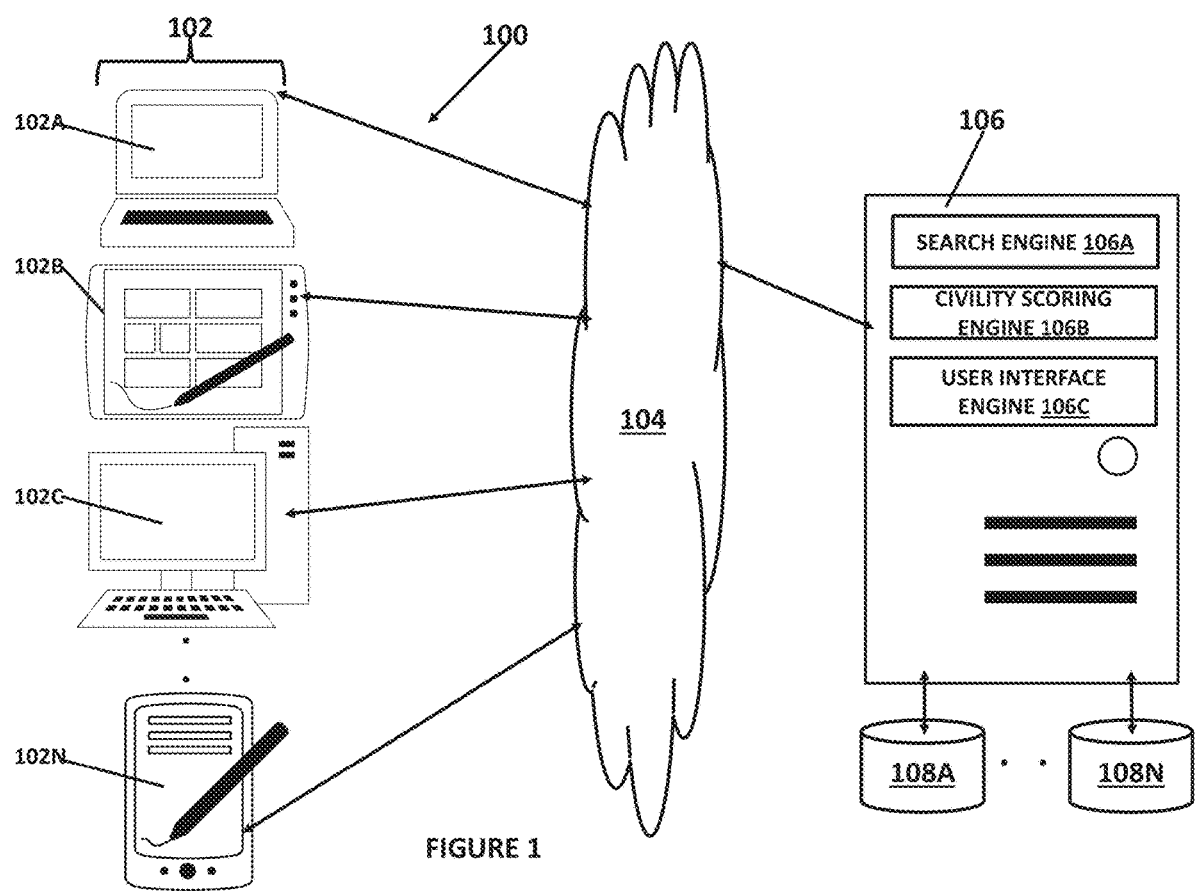
FIG. 1 is a block diagram of a system that incorporates a civility score engine that identifies personal attacks in an audio piece of content and generates a civility score for each piece of audio content that may be returned to the user as part of the search results.

The disclosure is particularly applicable to a consumer facing search engine that displays a civility score for each audio content, such as podcasts, wherein a civility score generating engine (that may be part of the above search engine or may be a separate system that generates the civility scores) may generate the civility scores for each piece of audio content using ensemble artificial intelligence (AI)/machine learning techniques so that the user can see whether a particular piece of audio content has a particular civility score based on personal attacks found by the civility score engine in the particular piece of audio content. Alternatively, the civility score for podcasts or other audio content may be used by an advertisement system that places advertisements or recommends ad placement in audio content that allows the customers who wish to place ads for audio content to make the ad placement decision based in part of the certain civility score associated with the piece of audio content. It should be understood that the disclosed system may be used for various different pieces of audio content (video with audio, etc.) and is not limited to podcasts. It also will be appreciated that the system and method may be implemented using different computer architectures such as a software as a service (SAAS) architecture or other known or yet to be developed computer system architectures. Furthermore, the system may implement an application programming interface (API) so that any business/system may request and receive the civility score generated for a particular piece of audio content. Furthermore, the system may be a standalone system accessed over the web by users as shown in FIG. 1, but may also be embedded/part of a larger system. The system and method may be used to score any type of audio content and return results although, for illustration purposes, podcasts will be discussed to illustrate the civility assessment. In a further alternative embodiment, the generated civility score for a piece of audio content may be used in a system in combination with the scoring disclosed in U.S. patent application Ser. No. 18/220,437 filed Jul. 11, 2023 (that is incorporated herein by reference) so that the scoring system may display pieces of content results to the user with the document quality scores and political leaning for written content (and possible the audio content such as podcasts) and the civility scores for the audio content.

The system and method disclosed below may have various technical features including proprietary processes for annotating, diversifying and de-noising large training sets that is crucial for accounting for the variability in cultural interpretations and norms, one or more large language model (LLM) transformer architectures that focus not only on the parts of the text that may contain attacks but also, the broader context, proprietary processes for assigning a civility score to an entire episode and in turn, show and proprietary prompt engineering techniques that corroborate domain-expert knowledge and enable the AI technology to align with the target task's objectives to identify personal attacks in audio pieces of content and generate a civility score. These technical features provide a technical solution to a technical problem of identifying personal attacks in audio content that cannot be achieved by a human being. In summary, the disclosed system and method provides many technical solutions and benefits over known conventional systems and these benefits are not achievable by a human being and require technology. The benefits include using the AI/ML/LLM technology to identify personal attacks in an audio piece of content in spite of the challenges discussed above that cannot be overcome by known systems and to generate a civility score.

FIG. 1 is a block diagram of a system 100 that incorporates a civility score engine 106B that identifies personal attacks and generates a civility score of each piece of audio content, such as podcasts, wherein the generated civility score for each piece of audio content may be returned to the user. The civility score may be displayed to a user as part of search results, as part of a way to determine advertisement placement in audio content or it may be displayed along with other scores (like document quality scores and political leaning scores as disclosed in U.S. patent application Ser. No. 18/220,437 filed Jul. 11, 2023) in search results. Thus, the system 100 in FIG. 1 may be an advertising system and company that uses the generated civility scores for podcasts in which the advertising system allows its customers to identify podcasts for advertising wherein advertising money may be spent, for example, for podcasts with high civility scores indicating few or no personal attacks.

In each of the different possible alternatives of the system 100, a user may use a computing device 102 to connect to, communicate with and access a backend system 106 over a communications path 104 in order to perform certain actions or services such as selecting audio content for advertising campaigns or searches. Thus, the user connects to and communicates with the backend system 106, the system 106 performs its functions (e.g., generates a civility score for each piece of audio content, a search that returns a civility score for each piece of audio content or generating an advertising campaign for a user that selects audio content with high civility scores, etc.) and returns results to the user in a user interface generated by a user interface engine 106C. The civility score for each piece of audio content is generated in the same manner for both the search function and the advertising campaign function as described below in more detail. Furthermore, although the civility scoring engine 106B shown in FIG. 1 is part of the backend system 106, the civility scoring engine 106B may be an independent system that, for example, provides requested civility scores to third parties such as by using an API.

Figure 5:
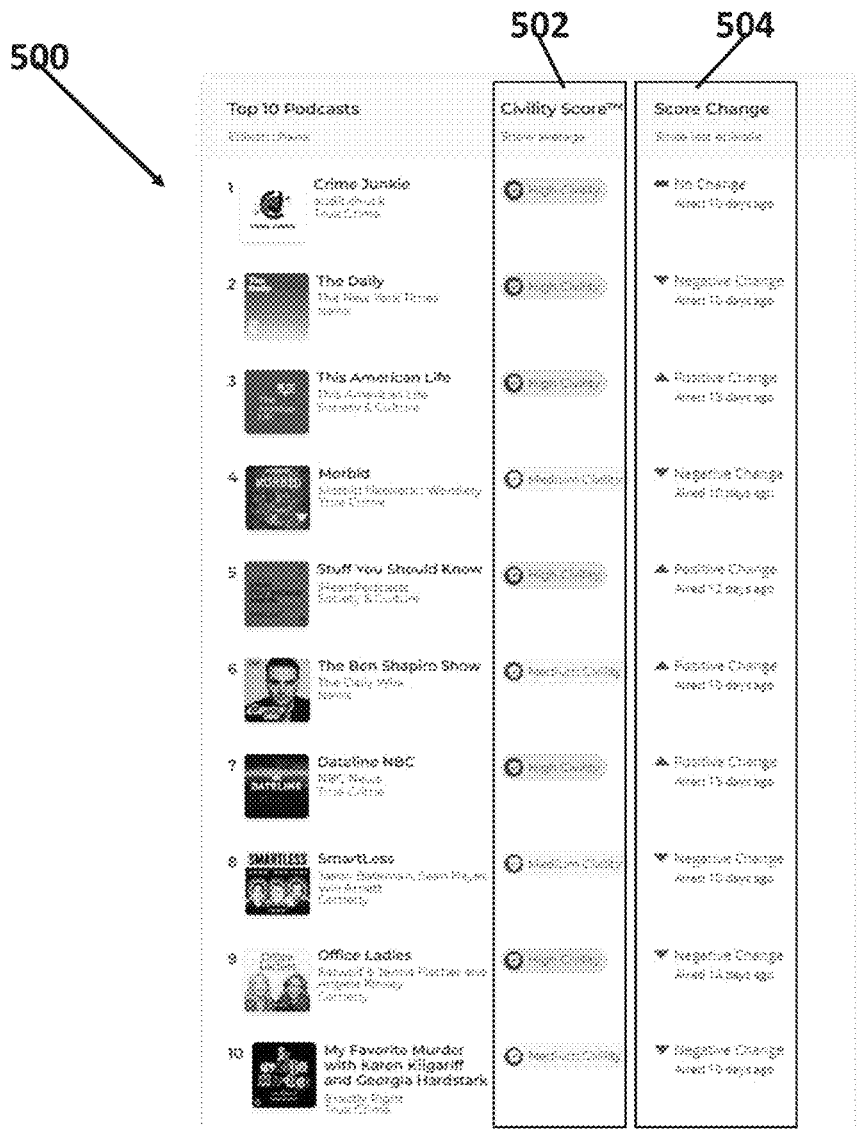
FIG. 5 illustrates an example of a user interface that displays various audio content, a civility score and a score change.

The system 100 may have a plurality of computing devices 102A, 102B, 102C . . . , 102N that can each independently access the system 106 (to perform a search and see results with a civility score or set up and run advertising campaigns and select audio pieces of content based on the civility scores) over the communications path 104. Each computing device may have a processor, memory, wireless or wired connectivity circuits to connect to the system 106 and a display wherein the memory stores a known browser application, such as Google® Chrome®, etc., that is a plurality of lines of instructions executed by the processor that allows the user to interact with the system 106 in a known manner. Alternatively, the processor of each computing device 102 may execute a mobile app or other application that is a plurality of lines of instructions executed by the processor that allows the user to interact with the system 106 in a known manner. The system 106 may send back data or HTML, pages with the search results (including civility scores) or advertising campaign results (with civility scores) that are converted into a user interface by the browser or application and displayed on the display of the computing device (examples of the user interface are shown in FIG. 5.)

As shown in FIG. 1, each computing device 102 may be a different device such as a laptop computer 102A. a tablet computer 102B, a personal computer 102D, a smartphone device 102N or any other device that is capable of connecting to and communicating with the backend system 106. The communications path 104 may be a wireless and/or wired path (or a combination of wired and wireless systems or networks) that may be secure or unsecure. Alternatively to the computer architecture shown in FIG. 1, the system 106 or the civility scoring engine 106B may have one or more Application Programming Interfaces (APIs) that provide the civility scores of audio content as a software as a service to third parties.

The backend system 106 may be implemented by one or more computing resources, such as server computers, blade servers, cloud computing resources, etc. that have at least one processor and memory that store and execute a plurality of lines of instructions/computer code to perform the search and scoring operations of the backend system 106. The system 106, when the system is a search system, may further have a search engine 106A, the civility scoring engine 106B and the user interface engine 106C, each of which may be a plurality of lines of instructions/computer code executed by the processor of the computer system that hosts the backend system 106. The search engine 106A may perform the well known search engine operations to parse a keyword query, perform the search and return the one or more pieces of content that form the search results in a well-known manner and with a civility score for each audio piece of content or return advertising campaign results based on the civility scores of the audio content. The scoring engine 106B may generate, using a combination of ensemble AI/ML techniques, a civility score for each piece of audio content, such as a podcast, that is discussed below in more detail with reference to FIG. 2. The user interface engine 106C collects the search results or advertising campaign results and the civility score(s) for each piece of audio content and send those back to each computing device is response to the request from each computing device in a well-known manner. The backend system 106 may have one or more hardware or software storage devices 108A, . . . , 108N, that may be hardware or software or a combination of hardware and software, that store the data used for the searches including the software for the various engines, user data, data used to perform the civility assessments. The storage devices may also store the training data for the AI techniques, the resultant civility score for each piece of audio content, the audio content data, a set of large language model prompts and a search index that are used to generate the civility score for each piece of audio content. In one embodiment, the backend system 106 shown in FIG. 1 may be preferable implemented using deep learning transformer models, large language models and weak labeling algorithms, graphics processing unit (GPU) Hardware and search indices.

The civility scoring engine 106B (including various artificial intelligence (AI) technology) provide a technical solution to the technical problem of identifying personal attacks in audio pieces of content in several novel ways and overcomes the limitations of conventional systems and techniques as discussed above. The technology leverages large language models, which possess a richer understanding of meaning, when compared to standard machine learning classification systems, to determine the meaning of a piece of audio content. When deciding whether a statement or discussion in a piece of audio content, such as a podcast, contains an attack, the civility scoring system 106B considers the broader context, making it capable of better differentiating innocuous statements from personal attacks. On the other hand, the technology is also able to identify instances where seemingly harmless words are used offensively. Importantly, the technology's ability to reason and navigate ambiguity, enables it to uncover indirect offenses and to also discern when language is not offensive.

The technical solutions of the civility scoring are provided by an ensemble of AI elements whose functions and operations cannot be performed by a human being or in the human mind. The AI elements may include proprietary processes for annotating, diversifying and de-noising large training sets which is crucial for accounting for the variability in cultural interpretations and norms and LLM transformer architectures that focus not only on the parts of the text that may contain attacks but also, the broader context. The AI elements may further include proprietary processes for assigning a civility score to an entire episode and in turn, show and proprietary prompt engineering techniques that corroborates domain-expert knowledge and enable the AI technology to align with the target task's objectives. Further details of the civility scoring and its AI aspects are now discussed with reference to FIGS. 2 and 3.

Figure 2:
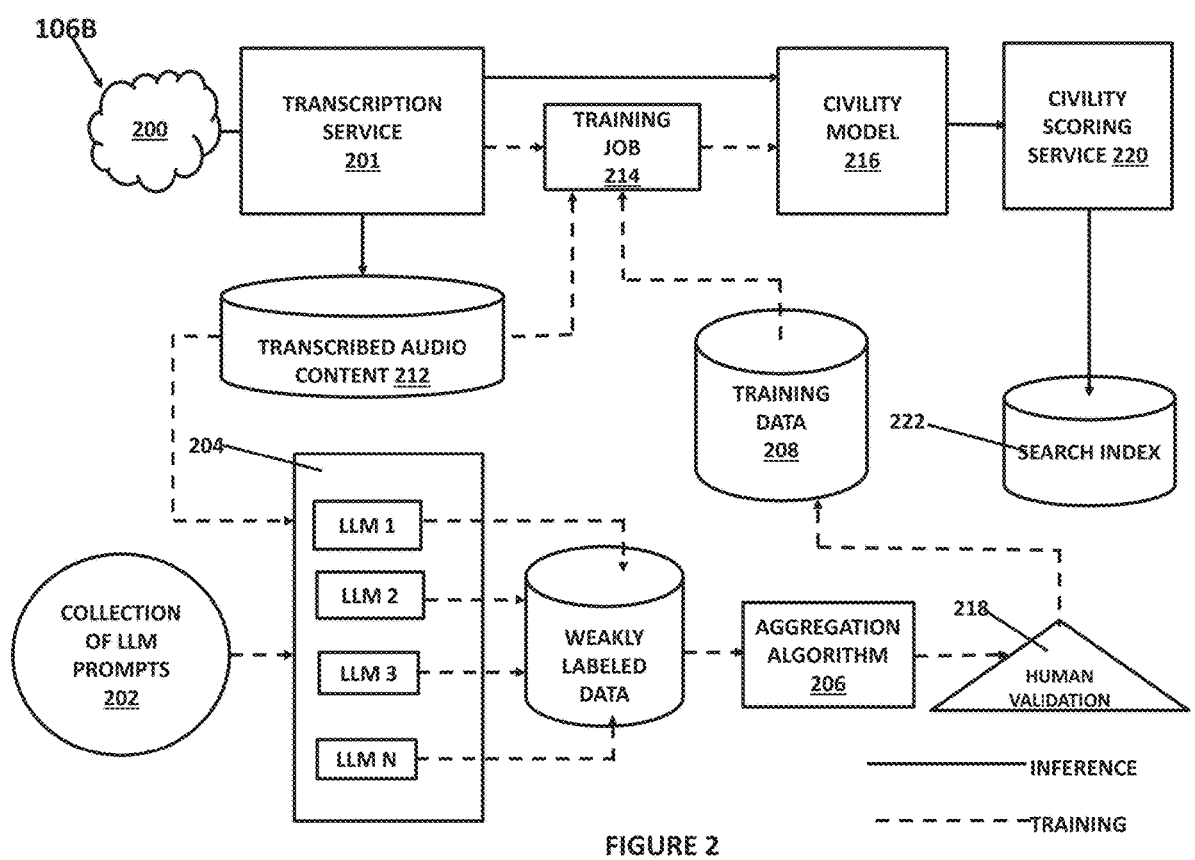
FIG. 2 illustrates more details of the civility scoring engine that identifies personal attacks in audio content, such as a podcast, and generates a civility score for each piece of audio content.
Figure 3:
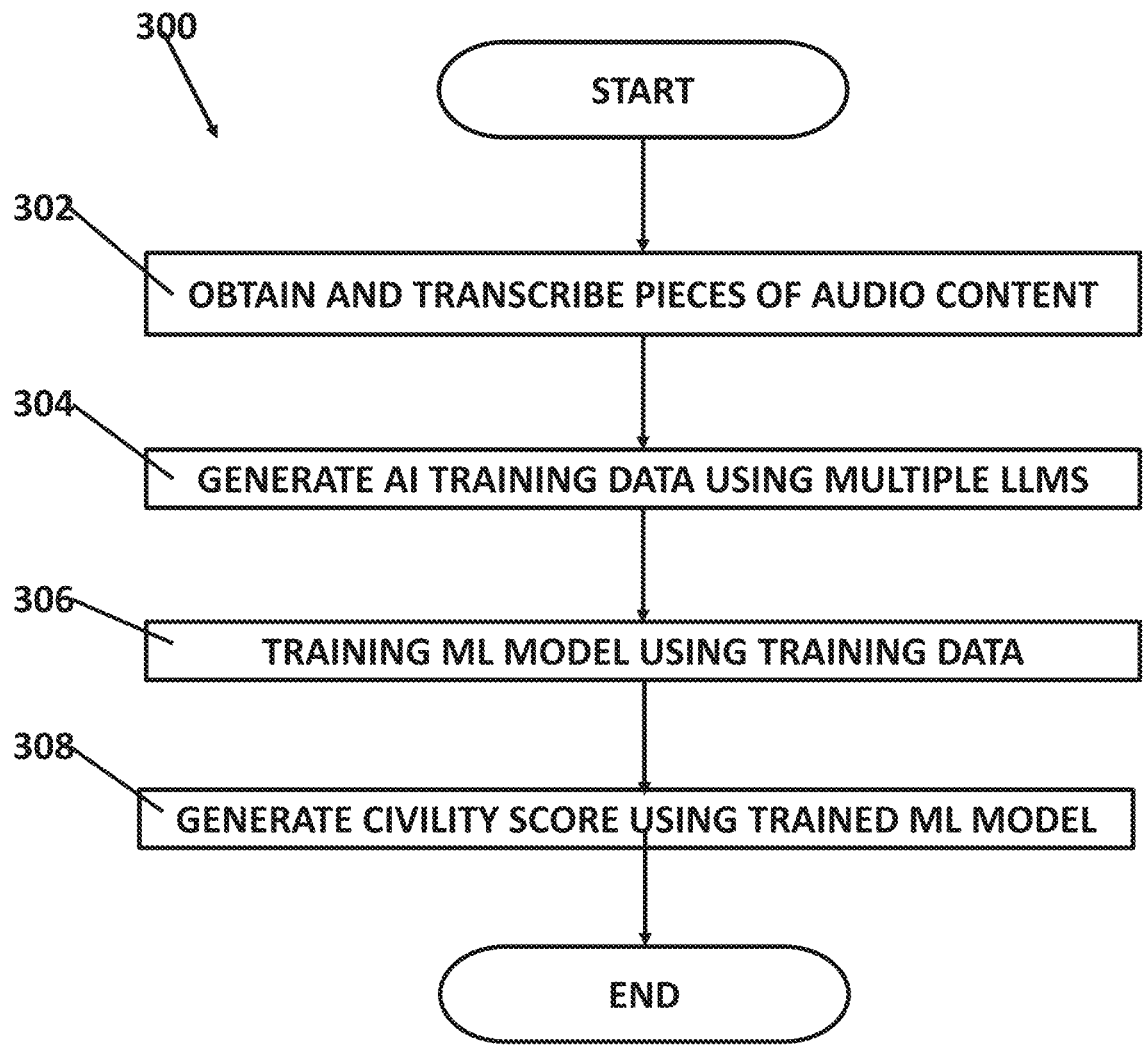
FIG. 3 illustrates a method for identifying personal attacks and generating a civility score for a piece of audio content.

FIG. 2 illustrates more details of the civility scoring engine 106B that identifies personal attacks in audio content, such as a podcast, and generates a civility score for each piece of audio content and FIG. 3 illustrates a method 300 for generating a civility score for a piece of audio content. The civility scoring engine 106B may be part of and integrated into a larger system 106 as shown in FIG. 1 or may be a service/tool implemented on a computer system that performs the analysis of each piece of audio content to generate the civility scores which are then available to third parties, such as via an API. The pieces of the civility score engine 106B may each be implemented as a plurality of lines of computer code/instructions that are executed by a processor of the computer system that hosts the civility scoring engine 106B so that the processor is configured to perform the operations and functions of the civility scoring engine 106B. FIG. 2 shows the inference data flow (solid lines) and training data flow (dotted lines) that result in the generation of the civility score.

The civility scoring engine 106B may receive a corpus of audio content 200 that may be, in one embodiment, a plurality of podcasts. Each of the pieces of audio content may be transcribed (process 302) to text using a known and commercially available transcription service 201 and stored in a store 212 (that can be implemented as a hardware, software and hardware/storage database). Each piece of transcribed audio content may consist of a list of transcribed text chunks that are stored in the store 212. In one implementation, during the transcription, each textual segment corresponds to the specific part of the audio recording where one person is speaking and thus isolates the parts of the audio where a single person is contributing to the conversation.

The civility scoring engine 106B may perform a process 304 to generate training data that is then used to train the machine learning (ML) model which is then used to identity any personal attacks and generate the civility score for each piece of audio content. The process 304 may annotate, diversify and de-noise large training sets which is crucial for accounting for the variability in cultural interpretations and norms. In one embodiment, the training data is generated using a plurality of large language models (LLMs) 204 (LLM1, LLM2, LLM 3, . . . LLMN as shown in FIG. 2). Thus, during the training data generation process, the collection of LLMs 204 are invoked using a collection of different LLM prompts 202 that may be expert crafted prompts to elicit information from the LLMs. Each LLM is instructed to label text chunks given a broader context since the labeling and subsequent scoring processes take into account a broader window of text around a specific text chunk being labeled or scored so that seemingly innocuous statements are not classified as attacks and also, subtle personal attacks are detected and classified as such. The collection of LLM prompts may be a plurality of prompts generated using known prompt engineering techniques such as chain-of-thought prompting, tree-of-thoughts prompting and others. An example prompt that may be used in the process is shown in FIG. 4. The novel prompt engineering techniques may corroborate domain-expert knowledge and enable the AI technology to align with the target task's objectives. In one embodiment, domain expert knowledge is injected into the LLMs via advanced prompting techniques and fine-tuning (examples of the prompts are shown in FIG. 4).

Once each LLM labels each text chunk for an audio piece of content, a store 205 (hardware or software database) stores the weakly labeled data that results from each LLM and each prompt. The weakly labeled data may be input to an aggregation process 206 whose output is a final label for each text chunk in the piece of audio content, such as a podcast. The aggregation process 206 combines all of the labeled text chunks from all of the LLMS into a final label. As shown in FIG. 2, the final label for each text chunk for each piece of audio content may be subject to human validation 218 and then stored in a training data store 208. Using the final labels stored in the training data database 208, the transcribed audio content 212 and the transcription service 201 data, a training job 214 is used to train (process 306 in FIG. 3) the civility machine learning model 216. In one embodiment, the civility model 216 may be a known transformer model that is trained using the labeled text chunk data generated using the LLMs 204 and aggregation process 206, the transcribed audio content 212 and the transcription service 201 data. Note that the training of the ML model may be performed once and then the ML model may be used to generate civility scores, although the training of the ML model may be updated periodically.

Once the civility model 216 is trained, the civility model (such as a transformer model) is used generate a civility score (220) for each piece of audio content to score each piece of audio content, such as a podcast, and assigns a civility score (308) for each transcribed piece of audio content. During the civility score determining, the process 308 may assign a civility score to an entire episode and in turn, an entire show that may then be shown to the user as shown in FIG. 5. The civility score for each piece of audio content indicates a quantity of personal attacks contained in each piece of audio content with a high civility piece of audio content having few or no personal attacks and thus being very civil while a low civility piece of audio content has a plurality of personal attacks.

In more detail, during the scoring process 220, each text chunk can be categorized as 1) not containing any person attack (non-attack); 2) containing a personal attack (attack); or 3) containing a strong personal attack (severe attack) based on the classification given by the civility model. Subsequently, a range of algorithms can be deployed to obtain the civility score for each episode. These algorithms works based on number of attacks and severe attacks normalized by the duration of each episode. It is understood by those skilled in the art that various different algorithms may be used to perform the scoring. In one embodiment, statistical methods are used to assess a frequency of personal attacks in relation to the entire range of podcasts.

An indexing process/job 222 writes the scored audio content (text chunks, episodes and/or shows) and scores into a search index/database so that the civility scores may be retrieved during a search and provided to a user. While FIG. 2 illustrates generating and storing the civility scores prior to a search or civility score request, the system 106B may also perform the civility score generation on the fly as needed.

FIG. 5 illustrates an example of a user interface 500 generated by the system that displays various podcasts, a civility score and a score change. In the example, the plurality of pieces of audio content are podcasts and the user interface shows a top 10 list of podcasts to a user along with the civility scores. The user interface may include a civility score portion 502 and a score change portion 504 for each podcast. Each podcast may be assigned a "low civility", "medium civility" or a "high civility" rating in the score portion 502. A user can review the civility score and select a podcast (during a search) or select a podcast for an advertising campaign. In addition to the civility score, the user interface may display a score change since last episode in the score change portion 504. The score change may be "no change", "negative change" or "positive change" and each may indicate when the podcast or audio content was aired.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
a computer system having a processor and a plurality of lines of instructions that are executed by the processor that is configured to:
retrieve a plurality of pieces of audio content;
generate, for each piece of audio content using a trained machine learning model, a civility score wherein the civility score for each piece of audio content indicates a quantity of personal attacks in each piece of audio content; and
display, on a display of a user computing device connected to the computer system, a civility score for one or more pieces of audio content.

2. The system of claim 1, wherein the trained machine learning model is a transformer model.

3. The system of claim 2, wherein the processor is further configured to generate, using the plurality of pieces of audio content, a set of training data to train the transformer model.

4. The system of claim 3, wherein the processor is further configured to invoke a plurality of large language models to generate a label for each portion of each piece of audio content and perform weak labeling of the generated labels to generate a label for each piece of audio content.

5. The system of claim 1, wherein the processor is further configured to transcribe each piece of audio content, generate a plurality of text chunks for each piece of audio content and generate a civility score for each text chunk for each piece of audio content.

6. The system of claim 1, wherein each piece of audio content is a podcast.

7. A method, comprising:
retrieving, by a computer system having a processor, a plurality of pieces of audio content;
generating, by a trained machine learning model executed by the processor of the computer system, for each piece of audio content, a civility score wherein the civility score for each piece of audio content indicates a quantity of personal attacks in each piece of audio content; and
displaying, on a display of a user computing device connected to the computer system, a civility score for one or more pieces of audio content.

8. The method of claim 7, wherein the trained machine learning model is a transformer model.

9. The method of claim 8 further comprising generating, by the computer system using the plurality of pieces of audio content, a set of training data to train the transformer model.

10. The method of claim 9 further comprising training the trained transformer model that further comprises invoking a plurality of large language models to generate a label for each portion of each piece of audio content and performing weak labeling of the generated labels to generate a label for each piece of audio content.

11. The method of claim 7 further comprising transcribing each piece of audio content, generating a plurality of text chunks for each piece of audio content and wherein generating the civility score further comprises generating a civility score for each text chunk for each piece of audio content.

12. The method of claim 7, wherein each piece of audio content is a podcast.

\* \* \* \* \*